United States Patent [19]
Doerge

[11] Patent Number: 5,840,212
[45] Date of Patent: Nov. 24, 1998

[54] RIGID FOAMS WITH IMPROVED INSULATION PROPERTIES AND A PROCESS FOR THE PRODUCTION OF SUCH FOAMS

[75] Inventor: Herman P. Doerge, Pittsburgh, Pa.

[73] Assignee: Bayer Corporation, Pittsburgh, Pa.

[21] Appl. No.: 736,167

[22] Filed: Oct. 23, 1996

[51] Int. Cl.⁶ .............................. C08J 9/14; C08K 3/00; C08G 18/00
[52] U.S. Cl. ........................... 252/350; 521/98; 521/131; 521/910
[58] Field of Search ..................... 521/131, 98; 252/350

[56] References Cited

U.S. PATENT DOCUMENTS

| | | | |
|---|---|---|---|
| 4,422,877 | 12/1983 | Spitzer et al. | 521/131 |
| 4,927,863 | 5/1990 | Bartlett et al. | 521/131 |
| 4,945,119 | 7/1990 | Smits et al. | 521/131 |
| 4,960,804 | 10/1990 | Doerge | 521/130 |
| 4,972,003 | 11/1990 | Grünbauer et al. | 521/131 |
| 4,996,242 | 2/1991 | Lin | 521/131 |
| 5,057,547 | 10/1991 | Doerge | 521/131 |
| 5,145,606 | 9/1992 | Omure et al. | 521/131 |
| 5,162,384 | 11/1992 | Owens et al. | 521/110 |
| 5,164,418 | 11/1992 | Behme et al. | 521/131 |
| 5,254,601 | 10/1993 | Doerge | 521/131 |
| 5,272,183 | 12/1993 | Doerge | 521/131 |
| 5,286,759 | 2/1994 | Smits et al. | 521/131 |
| 5,314,926 | 5/1994 | Robin et al. | 521/98 |
| 5,318,996 | 6/1994 | Yu-Hallada et al. | 521/131 |
| 5,397,808 | 3/1995 | Doerge et al. | 521/99 |
| 5,470,891 | 11/1995 | Green et al. | 521/131 |
| 5,496,866 | 3/1996 | Sommerfeld et al. | 521/131 |

*Primary Examiner*—Morton Foelak
*Attorney, Agent, or Firm*—Joseph C. Gil; Lyndanne M. Whalen

[57] ABSTRACT

Rigid foams having improved insulation properties are made by reacting a polyisocyanate with an isocyanate-reactive material in the presence of a blowing agent mixture composed of from about 1 to about 30% by weight of at least one $C_2$–$C_5$ polyfluoroalkane and from about 70 to about 99% by weight of an HCFC, preferably an HCFC selected from chlorodifluoromethane, 1,1-dichloro-1-fluoroethane, 1-chloro-1,1-difluoroethane and mixtures thereof.

12 Claims, No Drawings

RIGID FOAMS WITH IMPROVED INSULATION PROPERTIES AND A PROCESS FOR THE PRODUCTION OF SUCH FOAMS

BACKGROUND OF THE INVENTION

The present invention relates to a process for producing rigid foams with improved insulation characteristics (as measured by K-factor) and to the foams produced by this process.

Rigid polyurethane foams and processes for their production are known. Such foams are typically produced by reacting an isocyanate with an isocyanate-reactive compound such as a polyol in the presence of a blowing agent. Chlorofluorocarbons were the blowing agents most commonly used until recently. However, when it became known that these chlorofluorocarbons posed environmental problems, the search for alternative blowing agents began.

Among the blowing agents considered to be promising alternatives to the chlorofluorocarbons (CFCs) are the hydrogen-containing chlorofluorocarbons (HCFCs), highly fluorinated compounds (HFCs) and mixtures of HCFCs and HFCs. HCFC-141b is one of the more promising alternative blowing agents and has been the subject of a number of publications.

U.S. Pat. No. 5,397,808, for example, discloses low thermal conductivity foams made with a combination of HCFC-141b, perfluorinated compounds and carbon black. The perfluorinated compounds taught to be useful in this blowing agent combination include perfluorinated aliphatic hydrocarbons, perfluorinated cycloaliphatic hydrocarbons, perfluorinated N-aliphatic amino ethers, cyclic amino ethers, 1,3- or 1,4-amino ethers, perfluorinated ethers and perfluorinated tertiary alkylamines.

U.S. Pat. No. 5,318,996 discloses rigid insulating polyurethane foams prepared from ternary blowing agent mixtures which blowing agent mixtures were composed of water, HCFC-22 or HCFC-141b and a perfluorinated hydrocarbon having from 3 to 8 carbon atoms.

U.S. Pat. No. 4,927,863 discloses a process for the production of closed-cell polyurethane foams in which a mixture of a 2 carbon hydrogen-containing halocarbon (such as HCFC-141b and HCFC-123) with a shrinkage-minimizing halocarbon such as any of the known CFCs, HCFC-22, HFC-32, HCFC-124, HCFC-133a, HFC-134a, HCFC-142b and HFC-152a is used as the blowing agent.

U.S. Pat. No. 4,960,804 discloses rigid foams produced using a blend of a chlorofluorocarbon and an alkyl alkanoate as the blowing agent. HCFC's such as 1,1-dichloro-2,2,2-trifluoroethane and 1,1-dichloro-1-fluoroethane are among the chlorofluorocarbons taught to be suitable.

U.S. Pat. No. 4,996,242 discloses polyurethane foams made with two different halocarbons and an inert organic liquid are combined in specified amounts to form a ternary mixture which mixture is used as the blowing agent. The halocarbons taught to be suitable blowing agents for the disclosed ternary mixtures include at least one halocarbon having a boiling point below about 10° C. and at least one halocarbon having a boiling point from about 20° to about 35° C. Halocarbons having boiling points below 10° C. include 1,1-difluoroethane, 1,1,1-chlorodifluoroethane, 1-chloro-1,1,2,2,-tetrafluoroethane, 1-chloro-1,1,1,2-tetrafluoroethane and mixtures thereof. Halocarbons having a boiling point from 20° to 35° C. include trichlorofluoromethane, 1,1-dichloro-2,2,2-trifluoroethane, 1,1,1-dichlorofluoroethane. The inert organic liquids which are included in these ternary mixtures include pentane and substituted pentanes, hexane and substituted hexanes and haloalkanes.

U.S. Pat. No. 5,057,547 discloses mixtures of specific chlorofluorocarbons and specific hydrocarbons which are useful in the production of rigid, closed cell foams. The chlorofluorocarbons useful in these disclosed mixtures include 2,2-dichloro-1,1,1-trifluoroethane and 1,1-dichloro-1-fluoroethane. The hydrocarbons useful in these mixtures include n-pentane, 2-methyl butane, hexane, the position isomers of hexane and mixtures thereof.

U.S. Pat. No. 5,162,384 discloses foamed plastics made with blowing agent emulsions composed of at least one low boiling perfluorinated, N-aliphatic, cyclic 1,3- or 1,4- aminoether blowing agent, a foamable reaction mixture and a fluorochemical surfactant.

U.S. Pat. No. 5,164,418 discloses a process for producing foams using fluoroalkanes represented by the formula $C_aH_bF_c$ are used as the blowing agent.

U.S. Pat. Nos. 5,254,601 and 5,272,183 each discloses HCFC-Blown rigid foams having low thermal conductivities. These foams are produced using a blowing agent mixture that includes from about 0.1 to about 1.0% by weight water and 1,1-dichloro-2,2,2-trifluoroethane or dichlorofluoroethane.

U.S. Pat. No. 5,314,926 discloses foams blown with mixtures of 1,1,12,3,3,3-heptafluoropropane and one or more hydrocarbons or partially halogenated alkanes.

U.S. Pat. No. 5,470,891 discloses rigid polyisocyanate-based foams which are produced using water and a $C_{1-4}$ hydrofluorocarbon having a boiling point of 300° K. or less as the blowing agent.

U.S. Pat. No. 5,496,866 discloses polyfluoroalkanes which are useful as propellants. Water and other highly volatile organic substances may optionally be included in a foam-forming mixture in addition to these polyfluoroalkanes.

SUMMARY OF THE INVENTION

It is an object of the present invention to provide a process for the production of rigid foams having improved insulation properties.

It is also an object of the present invention to provide a blowing agent mixture for use in the production of rigid polyurethane foams which does not include a CFC.

It is another object of the present invention to provide rigid foams having lower thermal conductivities as measured by K-factor than rigid foams produced using the polyfluoroalkane alone as the blowing agent.

These and other objects which will be apparent to those skilled in the art are accomplished by reacting an organic isocyanate with an isocyanate-reactive compound in the presence of a blowing agent mixture made up of from 1 to 30% by weight of $C_2$–$C_5$, preferably a $C_3$–$C_5$ polyfluoroalkane and from 70 to 99% by weight of an HCFC which is preferably selected from 1,1-dichloro-1-fluoroethane (HCFC-141b), chlorodifluoromethane (HCFC-22), 1-chloro1,1-difluoroethane (HCFC-142b) and mixtures thereof.

DETAILED DESCRIPTION OF THE PRESENT INVENTION

The present invention relates to a blowing agent mixture, to rigid foams having reduced thermal conductivities as measured by K-factor below (i.e., a thermal conductivity which is lower than the thermal conductivity of a rigid foam produced using a single hydrochlorofluorocarbon, a single hydrofluorocarbon or a mixture of hydrofluorocarbons as a blowing agent) and to a process for the production of those foams in which no CFC is used as the blowing agent.

The blowing agent mixture of the present invention is made up of from 1 to 30% by weight, preferably from 3 to 27% by weight, most preferably from 3 to 15% by weight (based on the total weight of the blowing agent mixture) of one or more $C_2$–$C_5$, preferably $C_3$–$C_5$ polyfluoroalkanes and from 70 to 99% by weight, preferably from 73 to 97% by weight, most preferably from 85 to 97% by weight (based on the total weight of the blowing agent mixture) of an HCFC which is preferably selected from 1,1-dichloro-1-fluoroethane, chlorodifluoromethane (HCFC-22), 1-chloro-1,1-difluoroethane (HCFC-142b) and mixtures thereof. Where a mixture of polyfluoroalkanes is used, the total amount of all polyfluoroalkanes in the mixture should be within the above-specified ranges for polyfluoroalkanes. Where a mixture of HCFCs is used in the blowing mixture of the present invention, the total amount of HCFCs in the mixture should be within the above-specified ranges for HCFCs. The blowing agent mixture of the present invention is generally included in the foam-forming mixture in an amount of from 8 to 20% by weight, preferably from 10 to 15% by weight, based on the total weight of the foam-forming mixture.

Water may optionally be included in the blowing agent mixture of the present invention. If used, water is generally included in an amount of up to 10 wt %, preferably from about 0.1 to about 3.0% by weight, based on the total weight of the foam-forming mixture. The water should not, however, generally be used in an amount which is greater than from about 0.1 to about 2.0% by weight (based on the total weight of the foam-forming mixture), preferably from about 0.3 to about 1.0% by weight.

The $C_2$–$C_5$ polyfluoroalkanes useful in the present invention include those represented by the formula $$CX_3\text{-}CY_2\text{-}R \qquad (I)$$

in which

X represents hydrogen or fluorine,

Y represents hydrogen, fluorine or $CF_3$ and

R represents H, F, $CH_2F$, $CHF_2$, $CH_3$, $CF_3$, $CF_2$—$CH_3$, $CF_2CH_2F$, $CH_2$—$CH_3$, $CH_2$—$CH_2$—$CH_3$ or —CH($CH_3$)—$CH_3$ and the total number of carbon atoms present in from 3 to 5 and at least two fluorine atoms are present. Mixtures of such polyfluoroalkanes may, of course, also be used.

Preferred polyfluoroalkanes include those represented by Formula I in which $CX_3$ represents a $CF_3$, $CHF_2$ or $CH_3$ group and $CY_2$ represents a $CH_2$, CHF, $CF_2$ or $C(CF_3)H$ group. Examples of such preferred polyfluoroalkanes include: 1,1,2,2,3-pentafluoropropane (HFC-245ca); 1,1,2,3,3-pentafluoropropane (HFC-245ea); 1,1,1,3,3-pentafluoropropane (HFC-245fa); pentafluoropropylene (HFC-2125a); 1,1,1,3-tetrafluoro-propane; tetrafluoropropylene (HFC-2134a); difluoropropylene (HFC-2152b); 1,1,1,3,3-pentafluoro-n-butane; 1,1,1,3,3,3-hexafluoropropane; 2,2,4,4-tetrafluorobutane; 1,1,1,3,3,3-hexafluoro-2-methylpropane; 1,1,1,3,3,4-hexafluorobutane; 1,1,1,4,4,4-hexafluoro-butane (HFC-356); 1,1,1,2-tetrafluoroethane (HFC-134a); 1,1-difluoroethane (HFC-152a); and mixtures thereof.

The most preferred polyfluoroalkanes are the pentafluoropropanes. Any of the known isomers of pentafluoropropane may be used in the blowing agent mixture of the present invention. Examples of such pentafluoropropane isomers include: 1,1,2,2,3-pentafluoropropane (HFC-245ca); 1,1,2,3,3-pentafluoropropane (HFC-245ea); and 1,1,1,3,3-pentafluoropropane (HFC-245fa). The most preferred pentafluoropropane isomer is 1,1,1,3,3-pentafluoropropane. The pentafluoropropanes are particularly preferred because when they are included in the blowing agent mixture of the present invention, foams having K-factors of 0.12 Btu-in./hr.ft.$^{2\circ}$ F. or less are obtained.

Levels of $C_2$–$C_5$ polyfluoroalkane above 30% by weight of the total blowing agent mixture have a detrimental effect upon the thermal conductivity properties of the resultant foam and are not therefore recommended. However, such higher levels of polyfluoroalkanes would produce a foam with good physical properties but with higher K-factors than those achieved with foams produced in accordance with the present invention.

Any of the known HCFCs may be used in the blowing agent mixtures of the present invention. The 1,1-dichloro-1-fluoroethane (HCFC-141b), chlorodifluoro-methane (HCFC-22) and 1-chloro-1,1-difluoroethane (HCFC-142b) which are particularly preferred HCFCs useful in the blowing agent mixtures of the present invention are known and commercially available. HCFC-141b is the most preferred of these HCFC blowing agents.

As is known in the art, rigid foams are prepared by reacting polyisocyanates with isocyanate-reactive compounds. Any of the known organic polyisocyanates may be used in the present invention. Suitable polyisocyanates include: aromatic, aliphatic and cycloaliphatic polyisocyanates and combinations thereof. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane,1,4-diisocyanate, hexahydrotoluene diisocyanate (and isomers), naphthylene-1,5-diisocyanate, 1-methylphenyl-2,4-phenyl diisocyanate, diphenyl-methane-4,4'-diisocyanate, diphenylmethane-2,4'-diisocyanate, 4,4'-biphenylene diisocyanate, 3,3'-methoxy-4,4'-biphenylene diisocyanate and 3,3'-dimethyl-diphenylpropane-4,4'-diisocyanate; triisocyanates such as toluene-2,4,6-triisocyanate and polyisocyanates such as 4,4'-dimethyldiphenyl-methane-2,2',5,5'-tetraisocyanate and the diverse polymethylene polyphenyl polyisocyanates.

A crude polyisocyanate may also be used in making polyurethanes, such as the crude toluene diisocyanate obtained by the phosgenation of a mixture of toluene diamines or the crude diphenylmethane diisocyanate obtained by the phosgenation of crude diphenylmethanediamine. The preferred undistilled or crude polyisocyanates are disclosed in U.S. Pat. No. 3,215,652, incorporated by reference.

Especially preferred for making rigid polyurethanes are methylene-bridged polyphenyl polyisocyanates and prepolymers of methylene-bridged polyphenyl polyisocyanates, having an average functionality of from about 1.8 to about 3.5, preferably about 2.0 to about 3.1 isocyanate moieties per molecule and an NCO content of from about 28 to about 34% by weight, due to their ability to cross-link the polyurethane. The isocyanate index (ratio of equivalents of isocyanates to equivalents of active hydrogen-containing groups) is advantageously from about 0.9 to about 3.0, preferably about 1.0 to about 2.0 and most preferably from about 1.0 to about 1.5.

Any of the known organic compounds may be used to produce foams in accordance with the present invention.

Polyols containing at least two isocyanate-reactive hydrogen atoms and having a hydroxyl (OH) number of from about 200 to about 650 (preferably from about 400 to about 500) and polyols prepared from amines and polyamines having an amine functionality of from about 1 to about 4 and a molecular weight of from about 149 to about 1500 (preferably a hydroxyl functionality of from 3 to 4 and a molecular weight of from about 200 to about 1800) are particularly preferred isocyanate-reactive compounds useful in the practice of the present invention. The molecular weight of such isocyanate-reactive materials are determined in accordance with the end group analysis method generally used by those skilled in the art and represent a number average molecular weight.

Suitable high functionality, high molecular weight polyols may be prepared by reacting a suitable initiator containing active hydrogens with alkylene oxide. Suitable initiators are those containing at least 4 active hydrogens or combinations of initiators where the mole average of active hydrogens is at least 4, preferably from about 4 to about 8, and more preferably from about 4 to about 6. Active hydrogens are defined as those hydrogens which are observed in the well-known Zerewitinoff test, see Kohler, Journal of the American Chemical Society, p. 3181, Vol. 49 (1927). Representative of such active hydrogen-containing groups include —OH, —COOH, —SH and —NHR where R is H or alkyl, aryl aromatic group and the like.

Examples of suitable initiators include pentaerythritol, carbohydrate compounds such as lactose, α-methylglucoside, α-hydroxyethylglucoside, hexitol, heptitol, sorbitol, dextrose, mannitol, sucrose and the like. Examples of suitable aromatic initiators containing at least four active hydrogens include aromatic amines such as toluene diamine, particularly meta-toluene diamine and methane diphenylamine, the reaction product of a phenol with formaldehyde, and the reaction product of a phenol with formaldehyde and a dialkanolamine such as described by U.S. Pat. Nos. 3,297,597; 4,137,265 and 4,383,102 (incorporated herein by reference). Other suitable initiators which may be used in combination with the initiators containing at least four active hydrogens include water, glycerine, trimethylolpropane, hexane triol, aminoethyl piperazine and the like. These initiators may contain less than four active hydrogens and therefore can only be employed in quantities such that the total mole average of active hydrogens per molecule remains at least about 3.5 or more. Particularly preferred initiators for the preparation of the high functionality, high molecular weight polyols comprise sucrose, dextrose, sorbitol, α-methylglucoside, α-hydroxyethylglucoside which may be employed separately or in combination with other initiators such as glycerine or water.

The polyols may be prepared by methods well-known in the art such as taught by Wurtz, *The Encyclopaedia of Chemical Technology,* Vol. 7, p. 257–266, Interscience Publishers Inc. (1951) and U.S. Pat. No. 1,922,459. For example polyols can be prepared by reacting, in the presence of an oxyalkylation catalyst, the initiator with an alkylene oxide. A wide variety of oxyalkylation catalysts may be employed, if desired, to promote the reaction between the initiator and the alkylene oxide. Suitable catalysts include those described in U.S. Pat. Nos. 3,393,243 and 4,595,743, incorporated herein by reference. However, it is preferred to use as a catalyst a basic compound such as an alkali metal hydroxide, e.g., sodium or potassium hydroxide, or a tertiary amine such as trimethylamine. The reaction is usually carried out at a temperature of about 60° C. to about 160° C., and is allowed to proceed using such a proportion of alkylene oxide to initiator so as to obtain a polyol having a hydroxyl number ranging from about 200 to about 650, preferably about 300 to about 550, most preferably from about 350 to about 500. The hydroxyl number range of from about 200 to about 650 corresponds to an equivalent weight range of about 86 to about 280.

Polyols of a higher hydroxyl number than 650 may be used as optional ingredients in the process of the present invention. Amine-based polyols having OH values greater than 650, preferably greater than 700 are particularly useful as optional ingredients.

The alkylene oxides which may be used in the preparation of the polyol include any compound having a cyclic ether group, preferably an α,β-oxirane, and are unsubstituted or alternatively substituted with inert groups which do not chemically react under the conditions encountered whilst preparing a polyol. Examples of suitable alkylene oxides include ethylene oxide, propylene oxide, 1,2- or 2,3-butylene oxide, the various isomers of hexane oxide, styrene oxide, epichlorohydrin, epoxychlorohexane, epoxychloropentane and the like. Most preferred, on the basis of performance, availability and cost are ethylene oxide, propylene oxide, butylene oxide and mixtures thereof, with ethylene oxide, propylene oxide, or mixtures thereof being most preferred. When polyols are prepared with combinations of alkylene oxides, the alkylene oxides may be reacted as a complete mixture providing a random distribution of oxyalkylene units within the oxide chain of the polyol or alternatively they may be reacted in a step-wise manner so as to provide a block distribution within the oxyalkylene chain of the polyol.

Such polyols include a sucrose-initiated polyol propoxylated to an average hydroxyl number of from about 400 to about 500, a sorbitol-initiated polyol propoxylated to an average hydroxyl number of about 450 to about 490, a sorbitol-glycerine initiated polyol having nominally an average of about 4.0 to about 4.4 active hydrogens and propoxylated to a hydroxyl number of about 450 to about 490.

The polyol is used in a quantity sufficient to allow the preparation of low friability, dimensionally stable and strong foams.

The polyamines useful in the practice of the present invention may be prepared by any of the known methods. In one known method, an aminoalcohol is reacted with a polyether having a good leaving group. In other known methods, a polyether polyol may be reacted with isatoic acid anhydride, or a halogen substituted nitrobenzene, or ammonia or an amine in the presence of a suitable catalyst.

Suitable optional polyols include polyether polyols, polyester polyols, polyhydroxy-terminated acetal resins, hydroxy-terminated amines and polyamines. Examples of these and other suitable materials are described more fully in U.S. Pat. No. 4,394,491, particularly in columns 3 to 5 thereof. Most preferred for preparing rigid foams are those having from about 2 to about 6 active hydrogens and having a hydroxyl number from about 50 to about 800, preferably from about 200 to about 650, and more preferably from about 300 to about 550. Examples of such polyols include those commercially available under the product names Terate (available from Hoechst Celanese Corporation) and Multranol (available from Bayer Corporation).

Other components useful in producing the polyurethanes of the present invention include surfactants, pigments, colorants, fillers, antioxidants, flame retardants, stabilizers, and the like.

When preparing polyisocyanate-based foams, it is generally advantageous to employ a minor amount of a surfactant to stabilize the foaming reaction mixture until it obtains rigidity. Such surfactants advantageously comprise a liquid or solid organosilicon compound. Other, less preferred surfactants include polyethylene glycol ethers of long chain alcohols, tertiary amine or alkanolamine salts of long chain alkyl acid sulfate esters, alkylsulfonic esters, alkylarylsulfonic acids. Such surfactants are employed in amounts sufficient to stabilize the foaming reaction mixture against collapse and the formation of large, and uneven cells. Typically, about 0.2 to about 5.0 parts of the surfactant per 100 parts per weight polyol composition are sufficient for this purpose.

One or more catalysts are advantageously used. Any suitable urethane catalyst may be used including the known tertiary amine compounds and organometallic compounds. Examples of suitable tertiary amine catalysts include triethylenediamine, N-methylmorpholine, pentamethyl diethylenetriamine, dimethylcyclohexylamine, tetramethylethylenediamine, 1-methyl4-dimethylaminoethyl-piperazine, 3-methoxy-N-dimethyl-propylamine, N-ethylmorpholine, diethylethanol-amine, N-cocomorpholine, N,N-dimethyl-N',N' dimethylisopropyl-propylene diamine, N,N-diethyl -3-diethyl aminopropyl amine and dimethyl-benzyl amine. Examples of suitable organometallic catalysts include organomercury, organolead, organoferric and organotin catalysts, with organotin catalysts being preferred. Suitable organotin catalysts include tin salts of carboxylic acids such as dibutyltin di-2-ethyl hexanoate and dibutyltin dilaurate. Metal salts such as stannous chloride can also function as catalysts for the urethane reaction. A catalyst for the trimerization of polyisocyanates, such as an alkali metal alkoxide or carboxylate, may also optionally be employed herein. Such catalysts are used in an amount which measurably increases the rate of reaction of the polyisocyanate. Typical amounts are about 0.01 to about 1 part of catalyst per 100 parts by weight of polyol.

The components described may be employed to produce rigid polyurethane and polyurethane-modified isocyanurate foam. The rigid foams of the present invention may be made in a one-step process by reacting all of the ingredients together at once, or foams can be made by the so-called "quasi prepolymer" method. In the one-shot process where foaming is carried out using machines, the active hydrogen containing compounds, catalyst, surfactants, blowing agents and optional additives may be introduced separately to the mixing head where they are combined with the polyisocyanate to give the polyurethane-forming mixture. The mixture may be poured or injected into a suitable container or molded as required. For use of machines with a limited number of component lines into the mixing head, a premix of all the components except the polyisocyanate can be advantageously employed. This simplifies the metering and mixing of the reacting components at the time the polyurethane-forming mixture is prepared.

Alternatively, the foams may be prepared by the so-called "quasi prepolymer" method. In this method a portion of the polyol component is reacted in the absence of catalysts with the polyisocyanate component in proportion so as to provide from about 10 percent to about 30 percent of free isocyanate groups in the reaction product based on the prepolymer. To prepare foam, the remaining portion of the polyol is added and the components are allowed to react together in the presence of catalysts and other appropriate additives such as blowing agent, surfactant, etc. Other additives may be added to either the prepolymer or remaining polyol or both prior to the mixing of the components, whereby at the end of the reaction a rigid polyurethane foam is provided.

The polyurethane foams of this invention are useful in a wide range of applications. Accordingly, not only can rigid appliance foam be prepared but spray insulation rigid insulating board stock, laminates and many other types of rigid foam can easily be prepared according to this invention.

The following Examples are given as being illustrative thereof. All parts and percentages given in these Examples are parts by weight and percentages by weight, unless otherwise indicated.

EXAMPLES

The following materials were used in the Examples which follow:

POLYOL: A blend made up of (1) 62% by weight (based on total weight of POLYOL blend) of a sucrose/propylene glycol/ethylene oxide/propylene oxide adduct (weight ratio of EO:PO of about 0.43:1) having an OH number of about 470; (2) 10% by weight (based on total weight of POLYOL blend) of an ethylene diamine/propylene oxide adduct having an OH number of about 770; and (3) 28% by weight (based on total weight of POLYOL blend) Stepanpol PS-2502A, an aromatic polyester polyol having an OH number of about 240 which is commercially available from Stepan Company.

SURFACTANT: A silicone surfactant which is commercially available from Air Products and Chemicals Inc. under the designation DC-5357.

CATALYST A: A tertiary amine catalyst which is commercially available from Rhein Chemie Corporation under the name Desmorapid PV.

CATALYST B: A strongly basic, amber-brown liquid having a characteristic amine odor which is commercially available from Air Products under the designation Polycat 41.

HCFC-141b: 1,1-dichloro-1-fluoroethane.

HFC-245fa: 1,1,1,3,3-pentafluoropropane.

HFC-356: 1,1,1,4,4,4-hexafluorobutane.

ISO: A modified polymethylene polyphenyl polyisocyanate prepolymer having an NCO group content of 29.5% which is commercially available from Bayer Corporation under the name Mondur E-577.

Examples 1–7

POLYOL, SURFACTANT, CATALYST A, WATER and blowing agent were combined in the amounts indicated in TABLE 1. This mixture was then combined with the amount of ISO indicated in TABLE 1 with stirring. The stirred mixture was then poured into a 10.5"×10.5"×2.5" cardboard box lined with a plastic bag where it was allowed to foam and set. The properties of the foam are reported in TABLE 1.

TABLE 1

| Mat'l/EX | 1 | 2 | 3 | 4 | 5* | 6 | 7 |
|---|---|---|---|---|---|---|---|
| POLYOL pbw | 66.05 | 65.80 | 66.18 | 66.24 | 66.30 | 66.05 | 66.05 |
| DC5357 pbw | 2.11 | 2.11 | 2.11 | 2.11 | 2.11 | 2.11 | 2.11 |
| PV, pbw | 1.26 | 1.26 | 1.26 | 1.26 | 1.26 | 1.26 | 1.26 |
| PC-41 pbw | 0.63 | 0.63 | 0.63 | 0.63 | 0.63 | 0.63 | 0.63 |
| WATER pbw | 0.70 | 0.70 | 0.70 | 0.70 | 0.70 | 0.70 | 0.70 |
| HCFC-141b pbw | 27.25 | 25.50 | 28.12 | 28.56 | 29.0 | 21.50 | 13.50 |
| HFC-245fa pbw | 2.00 | 4.00 | 1.00 | 0.50 | — | 8.00 | 16.00 |
| ISO. pbw | 122.4 | 122.4 | 122.4 | 122.4 | 122.4 | 122.4 | 122.4 |
| % HFC-245fa[1] | 6.8% | 13.6% | 3.4% | 1.7% | — | 27.1% | 54.2% |
| Friability | slight | slight | slight | slight | slight | very | very |
| K-Factor Btu-in./hr.ft$^2$°F. | 0.114 | 0.118 | 0.119 | 0.120 | 0.122 | 0.122 | 0.124 |
| Core Density (lbs/ft$^3$) | 1.54 | 1.54 | 1.51 | 1.50 | 1.51 | 1.50 | 1.53 |

[1]based on sum of the weight of HCFC-141b and HFC-245fa
*Comparative Example

Examples 8–9

POLYOL, SURFACTANT, CATALYST A, WATER and blowing agent were combined in the amounts indicated in TABLE 2. This mixture was then combined with the amount of ISO indicated in TABLE 2 with stirring. The stirred mixture was then poured into a 10.5"×10.5"×2.5" cardboard box lined with a plastic bag where it was allowed to foam and set. The properties of the foam are reported in TABLE 2.

TABLE 2

| MAT'L/EXAMPLE | 8 (Comparative) | 9 |
|---|---|---|
| POLYOL, pbw | 66.30 | 65.71 |
| DC5357, pbw | 2.11 | 2.11 |
| PV, pbw | 1.26 | 1.26 |
| PC-41, pbw | 0.63 | 0.63 |
| WATER, pbw | 0.70 | 0.70 |
| HCFC-141b, pbw | 29.00 | 27.59 |
| HFC-356, pbw | — | 2.00 |
| ISO, pbw | 122.40 | 122.40 |
| % HFC-356[2] | 0 | 6.7% |
| Friability | slight to moderate | slight to moderate |
| K-Factor (Btu-in./hr.ft.$^2$°F.) | 0.119 | 0.117 |
| Core Density (lbs./ft$^3$) | 1.54 | 1.56 |

[2]based on the sum of the weight HCFC-141b and HFC-356

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A blowing agent consisting of
    a) from about 1 to about 30% by weight of at least one $C_3$–$C_5$ polyfluoroalkane represented by the formula $CX_3$-$CY_2$-R in which
    X represents hydrogen or fluorine,
    Y represents hydrogen, fluorine or $CF_3$ and
    R represents H, F, $CH_2F$, $CHF_2$, $CH_3$, $CF_3$, $CF_2$—$CH_3$, $CF_2CH_2F$, $CH_2$—$CH_3$, $CH_2$—$CH_2$—$CH_3$ or —CH($CH_3$)—$CH_3$,
    b) from about 70 to about 99% by weight of an HCFC and
    c) optionally, up to 10% by weight (based on total foam-forming composition) of water
   in which the sum of a) plus b) is approximately 100% by weight.

2. The blowing agent of claim 1 in which the HCFC is selected from chlorodifluoromethane, 1,1-dichloro-1-fluoroethane, 1-chloro-1,1-difluoroethane and mixtures thereof.

3. A blowing agent consisting of
    a) from about 1 to about 27% by weight of at least one $C_3$–$C_5$ polyfluoroalkane represented by the formula $CX_3$-$CY_2$-R in which
    X represents hydrogen or fluorine,
    Y represents hydrogen, fluorine or $CF_3$ and
    R represents H, F, $CH_2F$, $CHF_2$, $CH_3$, $CF_3$, $CF_2$—$CH_3$, $CF_2CH_2F$, $CH_2$—$CH_3$, $CH_2$—$CH_3$ or —$CH(CH_3)$—$CH_3$,
    b) from about 73 to about 99% by weight of an HCFC,
    c) and optionally, up to 10% by weight (based on total weight of foam-forming mixture) of water
   in which the sum of a) plus b) is approximately 100% by weight.

4. The blowing agent of claim 3 in which the HCFC is selected from chlorodifluoromethane, 1,1-dichloro-1-fluoroethane, 1-chloro-1,1-difluoroethane and mixtures thereof.

5. A blowing agent consisting of
    a) from about 3 to about 15% by weight of at least one $C_3$–$C_5$ polyfluoroalkane represented by the formula $$CX_3\text{-}CY_2\text{-}R$$

in which
- X represents hydrogen or fluorine,
- Y represents hydrogen, fluorine or $CF_3$ and
- R represents H, F, $CH_2F$, $CHF_2$, $CH_3$, $CF_3$, $CF_2$—$CH_3$, $CF_2CH_2F$, $CH_2$—$CH_3$, $CH_2$—$CH_2$—$CH_3$ or —CH($CH_3$)—$CH_3$, b) from about 85 to about 97% by weight of an HCFC, c) and optionally, up to 10% by weight (based on total weight of foam forming mixture) of water in which the sum of a) plus b) is approximately 100% by weight.

6. The blowing agent of claim 5 in which the HCFC is selected from chlorodifluoromethane, 1,1-dichloro-1-fluoroethane, 1-chloro-1,1-difluoroethane and mixtures thereof.

7. The blowing agent of claim 1 in which the $C_3$–$C_5$ polyfluoroalkane is a pentafluoropropane.

8. The blowing agent of claim 7 in which the pentafluoropropane is 1,1,1,3,3-pentafluoropropane.

9. The blowing agent of claim 7 in which the HCFC is 1,1-dichloro-1-fluoroethane.

10. The blowing agent of claim 3 in which the $C_3$–$C_5$ polyfluoroalkane is a pentafluoropropane.

11. The blowing agent of claim 10 in which the pentafluoropropane is 1,1,1,3,3-pentafluoropropane.

12. The blowing agent of claim 10 in which the HCFC is 1,1-dichloro-1-fluoroethane.

\* \* \* \* \*